Patented June 27, 1944

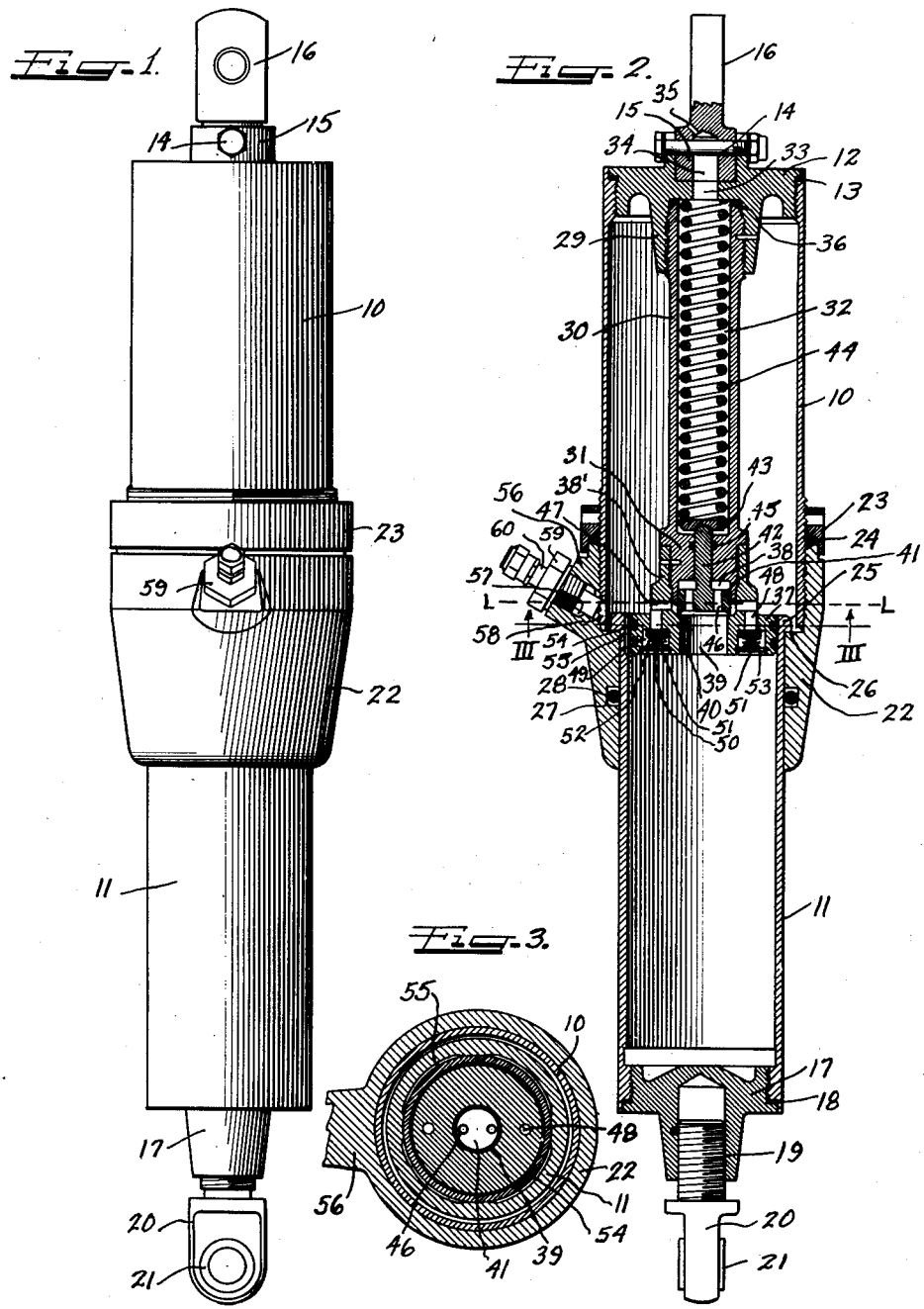

2,352,401

UNITED STATES PATENT OFFICE 2,352,401

SHOCK ABSORBING STRUT

Bernard E. O'Connor, Buffalo, N. Y., assignor to Houdaille-Hershey Corporation, Detroit, Mich., a corporation of Michigan Application August 10, 1942, Serial No. 454,233

3 Claims. (Cl. 267—64)

My invention relates to an improved shock absorbing strut adapted for general use, such as on vehicles, for absorbing jolts or bumps, but which is particularly useful on aircraft as a tail bump strut for checking and absorbing landing jolts and bumps, especially where the tricycle landing gear system is employed.

An important object of my invention is to produce an improved shock absorbing strut comprising two telescopically engaging cylinders for the flow of medium such as oil from one cylinder into the other against the compression resistance of elastic medium such as air for dampening and controlling the strut operation under load movements.

Another object is to provide improved valving arrangement for controlling the interflow of oil in the cylinders so that the strut may exert a constant resisting force against the load under all load movement conditions.

Another important object is to provide a strut in which, when the strut is under varying load conditions, oil is forced from the lower cylinder into the upper cylinder against compressed air therein for further compression of the air and for dampening of the load movement, together with improved valving means effective to resist the flow from the lower into the upper cylinder and to maintain a constant pressure in the lower cylinder for all relative velocity movements between the cylinders so that the resisting force exerted by the strut will remain constant while the strut is under load.

The various features of my invention are embodied in the structure shown on the accompanying drawing, in which drawing:

Figure 1 is a side elevation of the strut;

Figure 2 is a section on plane II—II of Figure 1; and

Figure 3 is a section on plane III—III of Figure 2.

The strut shown comprises the outer cylinder 10 and the inner cylinder 11 having telescopic engagement therein. In the arrangement shown the outer cylinder 10 is at the top and the inner cylinder 11 is at the bottom of the strut. The cylinder 10 has the head 12 at its upper end preferably screw threaded therein with a suitable packing ring 13 interposed. Secured to the head 12, as by a bolt 14, is the fitting 15 terminating in a lug 16 adapted to be secured to the main structure of the vehicle or airplane body with which the strut is associated.

At its lower end the cylinder 11 has the head 17 threaded therein with suitable packing 18 interposed, this head having the threaded bore 19 for receiving the threaded end of a fitting 20 which, as shown, has a bearing opening provided with bushing 21 which may receive a securing member on the tail wheel supporting frame (not shown) when the strut is used on an airplane.

At its lower end the upper cylinder 10 has the sleeve 22 secured thereto, as by threading, and a lock ring 23 is threaded on the cylinder to receive the upper end of the sleeve 22 and to compress the packing ring 24 against the cylinder to seal against leakage of fluid between the sleeve and the cylinder. The lower end of the sleeve 22 is of decreased inner diameter to receive the cylinder 11 which at its upper end has the external flange or head 25 for engaging the stop shoulder 26 on the sleeve 22 to limit the outward movement of the cylinder 11. The sleeve is shown provided with an annular channel 27 for a packing ring 28 for preventing escape of fluid between the cylinder and the sleeve to the exterior of the strut.

The head 12 of cylinder 10 has an annular flange 29 extending inwardly therefrom for receiving the upper end of a piston rod 30, the rod preferably threading into the flange. The piston rod terminates in a solid end 31 above which the rod is hollow to provide the space 32 which at its upper end communicates through the passageway 33 in the head 12 which registers with the space 34 in the fitting 15 connected by the passageway 35 with the exterior of the strut so that the space 32 is at all times in communication with the atmosphere. Suitable sealing packing 36 may be interposed between the upper end of the piston rod and the head 12 so as to seal the interior of the cylinder 10 from the piston rod space 32.

The cylinder 11 receives the piston 37 which has the annular extension or flange 38' thereon receiving the end 31 of the piston rod 30, the flange being preferably threaded to the end 31 to thereby rigidly secure the piston to the rod. In the rod end 31 is the valve chamber 38 which registers with the passageway 39 through the piston, the piston at the upper end of the passageway providing a valve seat 40 for the valve 41 in the valve chamber 38, a stem 42 extending upwardly from the valve through the end 31 of the piston rod and into the space 32. At its upper end the valve stem is engaged by a seat disk 43 for the lower end of the spring 44 in the rod space 32, the spring at its upper end abutting the head 12, the spring tending to hold the valve 41 seated. Suitable packing 45 seals against escape of fluid past the valve stem. Passageways 46 through the valve reduce the effective area of valve exposure to the pressure of the fluid within the cylinder 11, the outer end of the stem being subjected to atmospheric pressure only.

Ports 47 through the piston serve to connect the cylinder 11 with the cylinder 10 for fluid flow, these ports being closed by the valve when it is seated. Extending transversely through the piston are a number of passageways 48 connecting with valve chambers 49. Check valves 50 are provided for these passageways to seat across the inner ends thereof, abutments 51 being mounted in the chambers for springs 52 which tend to hold the valves closed, the abutments having flow passageways 53 therethrough.

The piston carries a number of sealing rings 54 which engage the cylinder 11, and the inner side of the cylinder 11 at the upper end thereof is cut out a distance to leave free flow or relief passages 55 for initial flow of fluid when the cylinder 11 moves into the cylinder 10, as will be referred to more in detail later.

At one side of the sleeve 22 is a boss 56 having the filler passageway 57 therethrough registering with the opening 58 in the wall of cylinder 10, through which opening liquid such as oil may be filled into the strut. A closure plug 59 is provided for the filler passageway 57 and into the plug extends an air valve 60 through which air may be charged into the strut.

In service position, the strut extends more or less vertical, its upper end, by means of the fitting 15, being secured to the body of a vehicle, such as an airplane, and the lower fitting 20 provides for attachment at the lower end of the strut to the structure to be controlled, as for example, the tail wheel of an airplane landing gear. The length between mounting centers of the strut may be adjusted by screwing the lower fitting 20 inwardly or outwardly in the head 17. To condition the strut for operation, the filler plug 59 is removed, and while the strut is in vertical position with the cylinder 11 fully extended, oil is poured in up to the level of the filler opening, as indicated by the line L—L, this level being a short distance above the upper end of the cylinder 11. The filler plug is now screwed in and air is charged through the air valve 60 into the cylinder 10 to a predetermined pressure, say, 30 to 40 pounds per square inch. As the relief passageways 55 are exposed when the cylinder 11 is extended, and the check valves 50 permit flow from the cylinder 10 to the cylinder 11, the air pressure in cylinder 10 will be transmitted to the cylinder 11 and the oil therein and the air will tend to hold the cylinder 11 extended with its abutment flange 25 in engagement with the shoulder 26 on the sleeve 22. The strut is now ready for service.

When the strut is compressed axially, as by application of a load thereto when the tail wheel engages the ground, the cylinder 11 will be moved into the cylinder 10, and during the fore part of such movement oil may flow comparatively freely from the cylinder 11 into the cylinder 10 through the free flow or relief passageways 55. As the cylinder 11 continues its movement, the passageways 55 are closed by the piston and the pressure of the oil within the cylinder 11 will be applied to the valve 41 to raise it from its seat for flow of the displaced oil through the ports 47 into the cylinder 10 against the resistance of the air which will be further compressed by the inflowing oil. Owing to the passageways 46 through the valve, the effective area subjected to the oil pressure is reduced, and this permits the use of a correspondingly weaker spring 44 for maintaining a given pressure within the cylinder 11. If such pressure within the cylinder 11 is exceeded, the valve 41 will be correspondingly further opened for flow of oil into the cylinder 10 against the back pressure of the compressed air. When this back pressure equals the pressure exerted by movement of the cylinder 11, further movement of the cylinder 11 will be stopped, and the compressed air will then hold the load on the strut. Upon release of the load against the cylinder 11, the compressed air pressure against the oil in the cylinder 10 will force this oil back into the cylinder 11 through the passages 48 in the piston and past the check valves 50 until the pressure is again equalized.

As the spring chamber 32 is vented at all times to the atmosphere, and is isolated from the interior of cylinder 10, the pressure within the cylinder 11 necessary to lift the valve from its seat is controlled by the valve spring 44, and this pressure in the cylinder 11 during movement thereof under load will be maintained substantially constant by the movement of the valve under control of the spring for corresponding flow of oil from the cylinder 11 into the cylinder 10 until the back pressure in the cylinder 10 equals the pressure in the cylinder 11, whereupon the cylinder 11 stops movement. The distance which the valve is lifted from its seat will automatically compensate for the change in pressure in the cylinder 11, and this movement of the valve under control of the spring will also automatically compensate for the change in volume of fluid flowing from the cylinder 11 into the cylinder 10. The varying pressure in the cylinder 10 will not affect the pressure in cylinder 11 unless it exceeds this pressure, and then oil will flow back from the cylinder 10 into the cylinder 11 until pressure balance is reestablished. In other words, the valve under control of the spring holds the pressure in the cylinder 11 constant for all relative velocities between the piston and the cylinder 11 so that the resisting force exerted by the strut remains constant during the entire movement of the cylinder 11 under load. The compressed air will permit the strut to carry a load over a period of time without fully telescoping, and, when the load is released, the air will force the oil back into the cylinder 11 for full extension of the strut. Under rapid movement of the cylinder 11, as from bumps or jolts, the compressed air will act as a cushion to absorb such shocks.

When the strut is used on an airplane, it is usually retracted into horizontal position within the airplane during flight of the plane. Under these conditions some of the oil will flow from the cylinder 11 through the relief passageways 55 into the cylinder 10, but when the strut is again brought into perpendicular position, the oil will return to the cylinder 11 to put the strut in condition for operation. These free flow or relief passageways are tapered at their inner ends so that, upon inward movement of the cylinder 11, the flow therethrough will be gradually stopped before the pressure within the cylinder 11 is exerted against the valve 42.

I have disclosed a practical and efficient embodiment of the various features of my invention, but I do not desire to be limited to the exact construction, arrangement or operation shown and described, as changes and modifications may be made without departing from the scope of the invention.

I claim as my invention:

1. A shock absorbing strut comprising an upper cylinder and a lower cylinder telescopically movable thereinto, a piston rod secured to the upper end of said upper cylinder and terminating at its lower end in a piston engageable in the lower cylinder, said upper cylinder being charged with compressed air under predetermined initial compression and said lower cylinder being filled with oil, a passageway through said piston for the flow of oil from said lower cylinder into the upper cylinder for further compression of the air when said strut is subjected to load and said lower cylinder is shifted into the upper cylinder, a valve chamber in said piston, a valve in said valve chamber for controlling said flow passageway, said piston rod being hollow and connected with the atmosphere, said valve having a stem extending therefrom into said hollow piston rod to be subjected to the atmospheric pressure, the other end of said valve being subjected to the pressure in said lower cylinder, and a spring in said piston rod abutting said valve stem and functioning to resist opening movement of said valve and to maintain the pressure in the lower cylinder constant for all relative movements of said cylinders when said strut is under load.

2. A shock absorbing strut comprising an upper cylinder and a lower cylinder telescopically movable thereinto, a piston rod secured to the upper end of said upper cylinder and terminating at its lower end in a piston engageable in the lower cylinder, said upper cylinder being charged with compressed air under predetermined initial compression and said lower cylinder being filled with oil, a passageway through said piston for the flow of oil from said lower cylinder into the upper cylinder for further compression of the air when said strut is subjected to load and said lower cylinder is shifted into the upper cylinder, a valve chamber in said piston, a valve in said valve chamber for controlling said flow passageway, said piston rod being hollow and connected with the atmosphere, said valve having a stem extending therefrom into said hollow piston rod to be subjected to the atmospheric pressure, the other end of said valve being subjected to the pressure in said lower cylinder, and a spring in said piston rod abutting said valve stem and functioning to resist opening movement of said valve and to maintain the pressure in the lower cylinder constant for all relative movements of said cylinders when said strut is under load, said piston having check valve control passageways therethrough independently of said flow passageway for return of oil from the upper cylinder to the lower cylinder when the load on the strut is being withdrawn.

3. A hydraulic shock absorbing structure comprising outer and inner cylinders telescopically engageable, a piston structure movable with said outer cylinder for engagement in said inner cylinder, a passageway through said piston structure for the flow of oil from said inner cylinder into the outer cylinder for further compression of the air when said inner cylinder is shifted into the outer cylinder, a valve chamber included in said passageway and a valve therein for controlling said passageway, a spring chamber in said piston structure disconnected from said cylinders and connected only with the atmosphere to be at all times under atmospheric pressure, said valve being subjected at its outer end to the atmospheric pressure in said spring chamber and subjected at its inner end solely to the pressure in said inner cylinder, and a spring within said spring chamber engaging said valve and functioning to resist opening thereof and flow from the inner cylinder into the outer cylinder and to maintain the pressure in the inner cylinder constant for all relative movements of the cylinders when said shock absorber structure is under load.

BERNARD E. O'CONNOR.